United States Patent [19]

Greenbaum

[11] 4,402,659
[45] Sep. 6, 1983

[54] MOLD CLAMPING FIXTURE

[75] Inventor: Arnold Greenbaum, Framingham, Mass.

[73] Assignee: American Optical Corporation, Southbridge, Mass.

[21] Appl. No.: 335,790

[22] Filed: Dec. 30, 1981

[51] Int. Cl.³ ............................................. B29D 11/00
[52] U.S. Cl. .................................... 425/233; 264/2.2; 425/346; 425/408; 425/410; 425/416; 425/808
[58] Field of Search ............... 425/808, 193, 410, 416, 425/233, 346, 408; 264/1.1, 2.2

[56] References Cited

U.S. PATENT DOCUMENTS

| | | | |
|---|---|---|---|
| 1,718,485 | 6/1929 | Sullivan | 425/12 |
| 2,472,022 | 5/1949 | Neal | 425/26 |
| 2,795,007 | 6/1957 | Covert | 425/12 |
| 3,016,569 | 1/1962 | Bingham, Jr. et al. | 425/119 |
| 3,093,447 | 6/1963 | Crandon | 425/808 |
| 3,118,198 | 1/1964 | Prunier | 425/808 |
| 3,134,572 | 5/1964 | Glasgow | 264/276 |
| 3,221,083 | 11/1965 | Cranden | 264/1 |
| 3,360,829 | 1/1968 | Germ | 425/589 |
| 3,380,718 | 4/1968 | Neefe | 264/2.2 |
| 3,475,521 | 10/1969 | Stroop | 425/808 |
| 3,479,696 | 11/1969 | Balhouse | 425/595 |
| 3,881,683 | 5/1975 | Whitney | 249/117 |
| 3,915,609 | 10/1975 | Robinson | 425/174.6 |
| 4,209,289 | 6/1980 | Newcomb et al. | 264/2.2 |
| 4,211,384 | 7/1980 | Bourset et al. | 425/808 |
| 4,284,399 | 8/1981 | Newcomb et al. | 425/410 |
| 4,347,198 | 8/1982 | Ohkada | 425/808 |

Primary Examiner—James B. Lowe
Attorney, Agent, or Firm—Kenway & Jenney

[57] ABSTRACT

A fixture for evenly distributing a predetermined clamping force about annular mating surfaces of a two-piece lens casting mold for avoidance of unwanted cast lens prism and/or edge flash.

8 Claims, 3 Drawing Figures

MOLD CLAMPING FIXTURE

FIELD OF THE INVENTION

This invention relates to fixtures useful in the manufacture of cast lenses and has particular reference to improvements in means for clamping mold halves of filled contact lens molds during curing of the contained lens precursor.

DISCUSSION OF THE PRIOR ART

In closed mold casting operations, particularly ophthalmic lens casting, there is concern that mold halves be tightly closed during the curing of contained casting precursors. Accordingly, various devices including spring clamps such as in U.S. Pat. No. 3,881,683 for example, and screw clamps having platens as in U.S. Pat. Nos. 3,221,083 and 3,915,609 have been employed.

These schemes, however, fail to afford the assurance of proper casting mold closure, i.e. closure with even distribution of mold clamping force.

In contact lens casting, e.g. as disclosed in U.S. Pat. No. 4,284,399, it is of considerable importance that male and female mold mating surfaces become tightly circumferentially closed for avoidance of unwanted cast lens prism and/or edge flash, the latter requiring tedious and costly secondary operations for removal and the former producing inferior product.

Accordingly, a principal object of the present invention is to provide means for assuring proper casting mold closure during precursor curing.

More particularly, there is the objective of providing fixturing for mold clamping wherewith mating surface closure is accomplished with evenly distributed force and unwanted cast lens prism and/or edge flash is avoided.

Other objects and advantages of the invention will become apparent from the following description.

SUMMARY OF THE DISCLOSURE

The foregoing is accomplished with a mold clamping fixture having upper and lower plates, the latter being provided with recessed casting mold pockets and the former carrying spring loaded mold clamping plungers specially designed with hemispherical mold engaging depending ends.

A recessed circular casting mold having annular mating surfaces is placed in a receiving pocket and engaged by the hemispherical end of a correspondingly aligned plunger. The depending end of the plunger enters the circular mold and automatically aligns the mold with the plunger axis for uniformly distributing plunger pressure about the circular configuration of the mold mating surfaces. Thus, the mold becomes tightly closed with uniformly applied pressure for avoidance of cast lens prism and/or flash after curing.

Details of the invention will become more readily apparent from the following description when taken in conjunction with the accompanying drawings.

IN THE DRAWINGS

DESCRIPTION OF THE PREFERRED EMBODIMENTS

Figure 1:
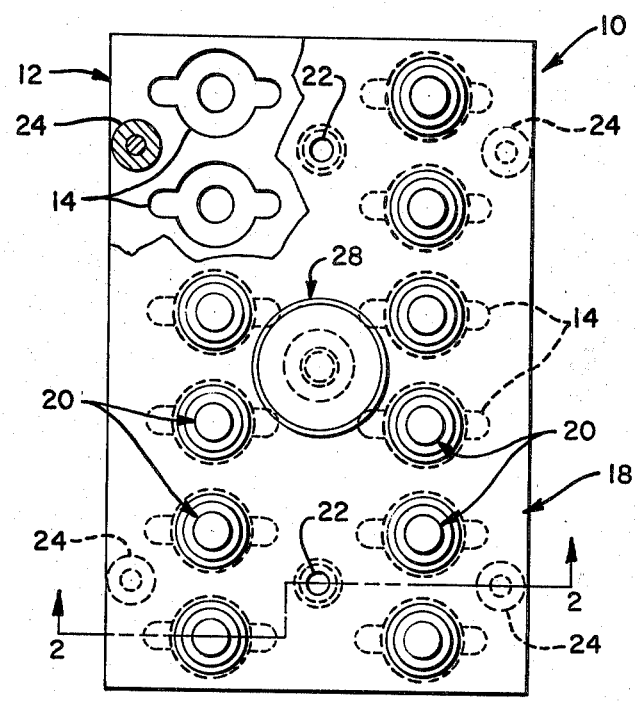
FIG. 1 is a plan view of a preferred embodiment of the invention.
Figure 3:
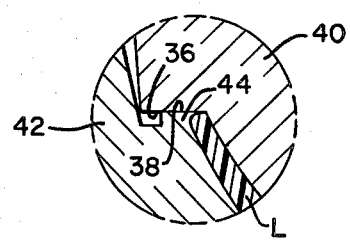
FIG. 3 is an enlargement of the junction area of a lens casting mold, the enlargement being taken from the area encircled by line 3 in FIG. 2.
Figure 2:
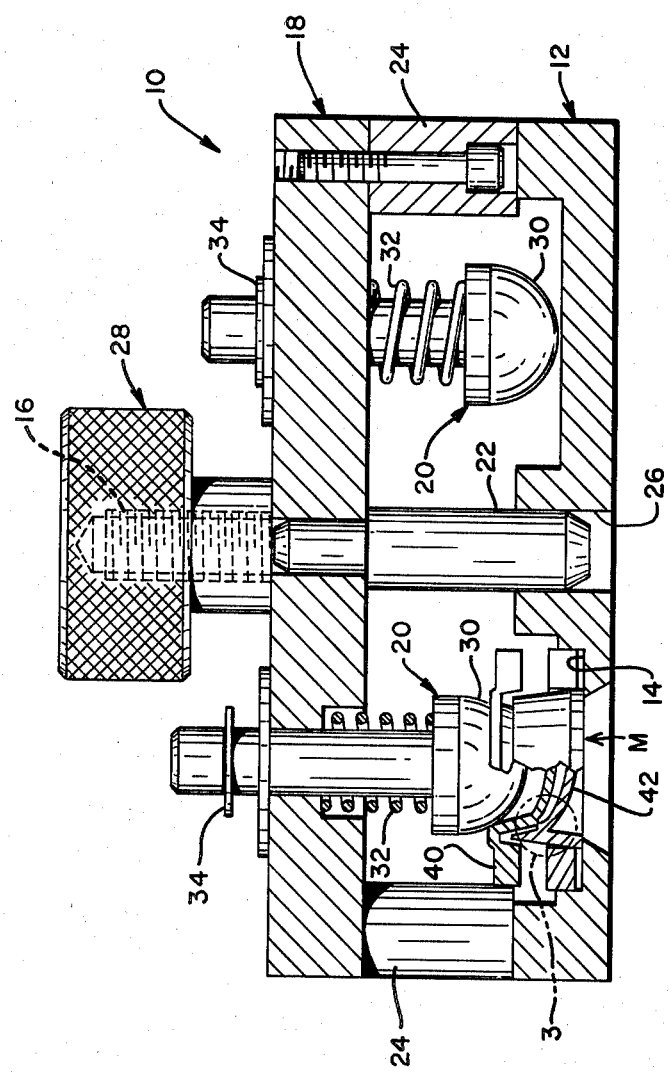
FIG. 2 is a cross-sectional view of the mold clamping fixture of FIG. 1 taken generally along line 2—2.

Referring more particularly to the drawings, fixture 10 comprises base plate 12 (FIG. 2) having mold receiving recesses 14 and upstanding fixture locking screw 16, the uppermost portion of which is illustrated with broken lines in FIG. 2.

Fitted over base plate 12 is mold clamping plate 18 carrying clamping plungers 20, locating pins 22 and spacers 24. The latter are provided for properly spacing plate 18 from base plate 12 in the fixture 10 assembly, i.e. when plate 18 is fitted over base plate 12 with locating pins 22 entered into openings 26. The assembly is locked with knob 28 threaded onto screw 16 tightly against plate 18.

Locating pins 22 bring plungers 20 into coaxial alignment with correspondingly positioned mold receiving recesses 14.

Plungers 20, depending from plate 18, terminate with enlarged hemispherical clamping ends 30. Compression springs 32 bias ends 30 of plungers 20 away from plate 18 and retaining washers 34 prevent separation of plungers from plate 18 when fixture 10 is disassembled for loading of lens casting molds M into recesses 14 or removal of same.

Operation of fixture 10 is as follows:

Knob 28 is removed, the assembly of plate 18, plungers 20, locating pins 22 and spacers 24 is lifted as a unit away from base plate 12 thereby providing easy access to mold receiving recesses 14.

A lens casting mold M, filled with its casting precursor and assembled as shown in FIG. 2, is placed in each recess 14. It should be understood, however, that fixture 10 is operable without full loading, i.e. if less than the full complement of casting molds is used, empty recesses 14 provide no problem since mold clamping is accomplished on an individual station basis as will be described shortly.

Details of lens casting molds clamped according to this invention can be found in U.S. Pat. No. 4,284,399 and, accordingly, such details will not be dealt with herein.

It should be apparent, however, that for avoidance of unwanted lens prism and/or edge flash in finished (cured) lenses L, mating surfaces 36 and 38 of male and female mold halves 40 and 42 must seat tightly and especially with uniform pressure (closing force) completely about the entire circle of joinder. For example, distortion of one side of rim 44 by uneven mold clamping pressure will tilt one mold half relative to the other causing prism error in the finally cured lens L. At the same time, portions of rim 44 not properly sealed will permit lens precursor leakage causing flash.

According to this invention, closing and clamping of plate 18 over base plate 12, with locating pins properly entered into openings 26, brings clamping ends 30 of hemispherical plunger components accurately into correspondingly circularly cupped male halves 40 of molds M thereby centering the male halves 40 for automatic application of a uniform closing and clamping force extending entirely about mold rim 44. Should slight axial misregistration of mold halves 40, 42 occur prior to entrance of end 30 of plunger 20, hemispherical end 30 will automatically perform the final mold piece alignment with entrance thereinto as shown in FIG. 2.

Desired final clamping forces are obtained by proper selection of springs 32 as would be readily apparent to the artisan. As noted in U.S. Pat. No. 4,284,399, a desirable clamping force is the equivalent of two to three pounds placed upon male mold half 40.

Those interested in details of suitable lens L precursors, and treatment thereof (curing in clamped molds) may refer to U.S. Pat. No. 4,284,399 and/or the references cited therein.

It should be apparent to those skilled in the art that various modifications and adaptations of the precise form of the invention herein disclosed may be made for special purpose application and that the present disclosure is not to be interpreted as restrictive beyond that necessitated by the following claims.

I claim:

1. In a fixture for clamping together two halves of a filled lens casting mold having annular mating surfaces, said mold having an upper mold half having a circular cupped surface, the improvement comprising:
   a base plate having a mold receiving recess;
   a clamping plate attachable to said base plate;
   a spring loaded mold engaging plunger depending from said clamping plate, said plunger being substantially aligned with said recess upon application of said clamping plate to said base plate, there being a spherically curved mold engaging surface at the terminus of said plunger for making contact with said circulary cupped surface of said upper mold half of a mold placed in said recess and for clamping said mold under the force of said spring loading, said mold clamping force being applied uniformly about said annular mating surfaces of said mold as a result of the contact of said spherical plunger terminus with said upper mold half.

2. The improvement according to claim 1 wherein said base plate and cover plate are respectively provided with a plurality of mold receiving recesses and spring loaded plungers, corresponding pairs of said recesses and plungers becoming axially aligned upon application of said clamping plate to said base plate.

3. The improvement according to claim 1 wherein said base and clamping plates are one provided with a locating pin and the other provided with a locating opening for receiving said pin whereby said alignment of plunger and mold receiving recesses is accomplished by entering of said pin into said opening.

4. The improvement according to claim 3 wherein said base and clamping plates are provided with a plurality of said locating pins and holes.

5. The improvement according to claim 1 wherein said terminus of said plunger is of a hemispherical shape.

6. The improvement according to claim 1 wherein said spring loading of said plunger urges same away from said clamping plate, there being stop means limiting extent of said plunger movement.

7. The improvement according to claim 1 wherein attachment of said clamping plate to said base plate is accomplished with screw and clamping knob, said screw being fastened to said base plate for extension through said clamping plate and reception of said knob, the latter being tightened against said clamping plate.

8. The improvement according to claim 1 including spacers carried by one of said base and clamping plates, said spacers functioning to establish a given distance between said plates in final assembly thereof, said given distance being that across which said plunger extends.

* * * * *